(12) United States Patent
Park et al.

(10) Patent No.: US 7,923,163 B2
(45) Date of Patent: Apr. 12, 2011

(54) STRUCTURE OF BIPOLAR PLATE FOR DIRECT METHANOL FUEL CELL AND SHAPE OF FLOW PATH THEREOF AND FUEL CELLS INCLUDING THEM

(75) Inventors: Jung-Ki Park, Daejeon (KR); Ho-Young Jung, Daejean (KR); Ki-Yun Cho, Seoul (KR); Kyung-A Sung, Deokjin Jeonju (KR); Wan-Keun Kim, Seoul (KR); Seong-Nam Lee, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 1126 days.

(21) Appl. No.: 11/652,928

(22) Filed: Jan. 12, 2007

(65) Prior Publication Data
US 2007/0160894 A1   Jul. 12, 2007

(30) Foreign Application Priority Data
Jan. 12, 2006   (KR) .................... 10-2006-0003613

(51) Int. Cl.
*H01M 8/02*   (2006.01)
*B32B 7/00*   (2006.01)
(52) U.S. Cl. ......... 429/456; 429/457; 429/518; 428/119
(58) Field of Classification Search .................. None
See application file for complete search history.

(56) References Cited

U.S. PATENT DOCUMENTS

| | | |
|---|---|---|
| 4,988,583 A | 1/1991 | Watkins et al. |
| 5,521,018 A | 5/1996 | Wilkinson et al. |
| 6,358,642 B1 | 3/2002 | Griffith et al. |
| 2003/0091884 A1* | 5/2003 | Scartozzi ........................ 429/32 |
| 2006/0147780 A1* | 7/2006 | Jiang et al. ..................... 429/34 |

OTHER PUBLICATIONS

Atul Kumar, R.G.Reddy; Modeling of polymer electrolyte membrane fuel cell with metal foam in the flow-field of the bipolar/end plates;Journal of Power Sources 114 (2003) 54-62.

* cited by examiner

*Primary Examiner* — Dah-Wei Yuan
*Assistant Examiner* — Angela J. Martin
(74) *Attorney, Agent, or Firm* — Clements Bernard PLLC; Gregory N. Clements

(57) ABSTRACT

The present invention relates to the structure of a bipolar plate for direction methanol fuel cell, the shape of a flow path and a fuel cell including them, more particularly, to the structure of a bipolar plate for direct methanol fuel cell using a flow path with a dispersion structure not the existing serpentine type for supplying a fuel to the new bipolar plate and functioning as a collector and the shape of a flow path. According to the present invention, a fluid flow resistance is decreased and a direct reaction region of a fluid and an electrode catalyst is increased in a bipolar plate, and therefore the performance of a fuel Cell can be improved.

5 Claims, 2 Drawing Sheets

STRUCTURE OF BIPOLAR PLATE FOR DIRECT METHANOL FUEL CELL AND SHAPE OF FLOW PATH THEREOF AND FUEL CELLS INCLUDING THEM

BACKGROUND OF THE INVENTION

1. Field of the Invention

The present invention relates, generally, to bipolar plates for direct methanol fuel cells, more particularly, to the structure of a bipolar plate for direct methanol fuel cell which can increase a reaction region between fuels and a catalyst layer as well as easily supply fuels to an electrode for direct methanol fuel cell and improve dispersion of the supplied fuel to enhance the performance of a fuel cell and the shape of a flow path and a direct methanol fuel cell including the same.

2. Description of the Related Art

Recently, as various goods are manufactured in accordance with the rapid development of an information communication technology, a technology related to portable electronic equipment such as cellular phones, laptop computers, personal digital assistants (PDA), digital cameras and camcorders has been remarkably growing.

The development of the technology related to the portable electronic equipment is represented in a high functionalization of portable electronic equipment in order to satisfy the tastes of the consumers requiring for more information.

However, this high functionalization was limited in a continuous use due to a large energy consumption and therefore, a device for supplying with energy became a core technology affecting the capability of electronic products. This technical request became a motive force to encourage researches and developments of a technology related to fuel cells in the developed countries like the USA and Japan.

A fuel cell is a device for directly converting a chemical energy into an electric energy, in which an oxidation reaction of a fuel occurs in an anode and a reduction reaction of oxygen occurs in a cathode. The basic structure of a fuel cell consists of a catalyst carrying anode, a cathode, a membrane/electrode assembly which is manufactured by inserting electrolyte layer between the anode and the cathode and a bipolar plate positioned on both surfaces of the membrane/electrode assembly. In the membrane/electrode assembly, the electrode functions as covering platinum catalyst on a carbon paper or a carbon cloth to directly induce the oxidation and reduction reactions of fuels through a catalyst and an electrolyte membrane functions as delivering hydrogen ions from an anode to a cathode due to a catalyst operation and as a separator keeping fuels from directly being mixed with oxygen.

In addition, the bipolar plate functions as supporting the membrane/electrode assembly, supplying and emitting methanol and oxygen which are supplied as a fuel to a cathode and an anode, respectively, and emitting the water produced in the cathode as well as functions as a collector for inducing the electrons produced in the anode to the cathode.

Currently, a bipolar plate for direct methanol fuel cell is made of a metal like a stainless steel or a graphite block of which corrosion and weight are improved. A flow path mainly has a serpentine type structure. However, the serpentine type structure increases a fluid-flow resistance when fuels are supplied to make it difficult to supply a fluid and disturb an activation reaction of electrodes, therefore the performance of a fuel cell may be degraded. Accordingly, researches and developments of a bipolar plate having the new shape and structure of a flow path are required in order to obtain the improved performance of a cell by improving a fluid-flow resistance.

Meanwhile, as the prior art about a flow path for fuel cell related to the present invention, a bipolar plate having a serpentine type flow path was disclosed in U.S. Pat. No. 4,988,583, U.S. Pat. No. 5,521,018 and U.S. Pat. No. 6,358,642 and Journal of Power Sources 114 (2003) 54, Atul Kumar, R. G. Reddy, etc. However, this bipolar plate based on a flow path with a serpentine type structure cannot avoid an increase of a fluid-flow resistance when fuels are supplied. Therefore, it becomes difficult to easily supply fuels and a phenomenon that the performance of a fuel cell decreases is shown. Accordingly, researches and developments of the structure of a bipolar plate and the shape of a flow path are desperately requested in order to improve the capability of a fuel cell.

SUMMARY OF THE INVENTION

Accordingly, the present invention has been made keeping in mind the above problems occurring in the related art, and an object of the present invention is to improve the performance of a fuel cell by increasing the reaction regions between a fuel and a catalyst layer as well as making it easy to supply a fuel of a bipolar plate for direct methanol fuel cell and improving the capability of dispersing the supplied fuels.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
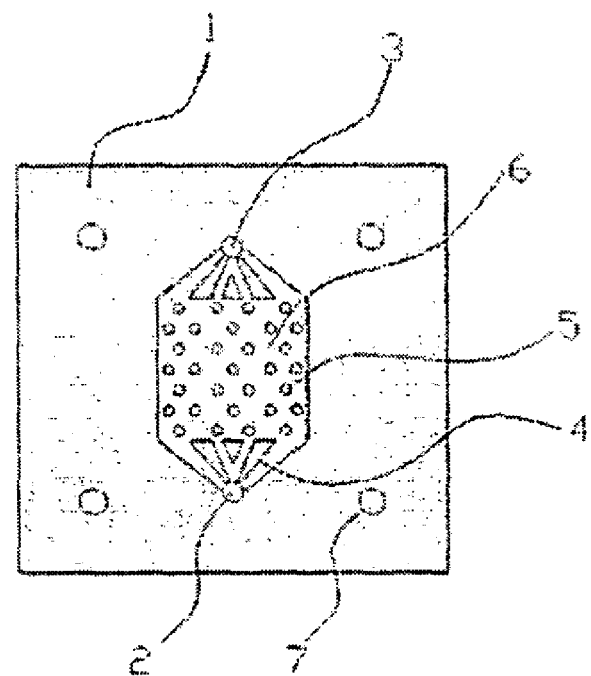
FIG. 1 is a schematic view of a bipolar plate manufactured in accordance with an embodiment.

In the present invention, a fuel cell for direct methanol comprises a catalyst carrying anode, a cathode, a membrane/electrode assembly manufactured by inserting an electrolyte membrane therebetween and a bipolar plate positioned on both surfaces of the membrane/electrode assembly.

For the present invention, the newly introduced bipolar plate (1) is manufactured to have a new shape for supplying fuels and a shape of a flow path for optimal dispersion of a fluid. The inlet and the outlet of a fluid of a bipolar plate are manufactured to have the same shape and the fluid injection port (2) is provided with a substantially triangular baffle (4) so that the same amount of fluids is uniformly flown and dispersed per regular interval of an electrode. In addition, the baffle is provided in the center of the fluid injection port in order to refrain from a channeling phenomenon that a fluid flows linearly in the center. Therefore, it is designed so that the fluid is injected through an injection port and passes through a substantially triangular baffle and a regular amount is flown when it is extended to the electrode. In addition, while the fluid passed through the substantially triangular baffle is extended to the electrode, it is provided with a dispersion dot type tap (5) without the existing serpentine type flow path for more efficient dispersion and distribution of a fluid flow. The dot type tap divides the flow of a fluid into two when a fluid is introduced and collided and the continuous division of the fluid from the injection port to the outlet (3)

makes it possible to obtain a uniform dispersion and distribution of the fluid in an electrode. The dot type tap is manufactured to have the diameter of 0.5 to 5 mm and the interval between each dot type tap of 0.5 to 10 mm so as to efficiently disperse a fluid flow. In addition, this dot type tap is manufactured to minimize a fluid flow resistance in order to improve the stagnation phenomenon of a fluid due to a flow resistance formed at a folded portion of the flow path with the existing serpentine type and the problem of disturbing an efficient electrode reaction therefrom. However, this dot type tap is a possible shape for a preferred embodiment of the present invention but it is not necessarily forced to be limited to the dot type tap as long as a flow path of a rhombus type, a rectangular type, cone type or a converse triangle type which generates the same effect is formed.

As described above, the fluid outlet (3) is manufactured to emit a fluid through an outlet after passing a substantially triangular baffle like the injection port, but their positions being symmetrical each other.

The bipolar plate used in the present invention, functioning as a collection plate, is made of a carbon plate with excellent electric conductance and corrosion resistance, but this was set forth to illustrate a possible material for a preferred embodiment of the present invention. The bipolar plate is not requested to limit to the material and can be made of titanium, stainless steel, brass, silver etc., as long at the same requirements are satisfied.

The platinum catalyst used in the present invention may be a platinum black catalyst, preferably a less than 60% (w/w) platinum supporting catalyst in carbon, more preferably a less than 40% (w/w) platinum supporting catalyst in carbon and the most preferably a less than 20% (w/w) platinum supporting catalyst in carbon. The catalyst for preventing a catalyst poison of a platinum catalyst used in the present invention may be a platinum/ruthenium (Ru) catalyst of 1/1 including ruthenium (Ru). The representative products are E-TEK, VULCAN, KETJEN, etc.

The gas diffusion layer used in the present invention is electric conductive and uses a carbon fiber capable of making a fluid flow easily, more preferably uses a carbon cloth or a carbon paper of which the representative product is Toray Carbon Paper. (manufactured by Toray Co., Ltd.) The gas diffusion layer used in the present invention may be coated with a hydrophobic layer like PolyTetraFluoroEthylene (PTFE) in order to make a fluid flow easy prior to the use.

In the present invention, the platinum catalyst (70 to 90% (w/w)) is mixed with Nafion binder (1 to 30% (w/w)) to be dispersed to a dispersion solution (DMAc) and be coated on a carbon fiber, and therefore an electrode is manufactured.

The polymer electrolyte membrane used in the present invention is made of an acid perfluoropolymer or its salt and the representative product is Nafion by DuPont, Flemion by Asahi, Aciplex by Asahi and Dow by Dow chemical. These polymers have an excellent mechanical property, a thermal stability and a chemical resistance because the main chains are formed of fluorinated polymers. The side chains are formed of fluorinated polymers to include a sulfonic acid group at the end. The polymer electrolyte membrane used in the present invention has an equivalent weight of 1200 (mg/Eq) or less, preferably 1100 (mg/Eq) or less. The polymer electrolyte membrane used in the present invention has the thickness of 50 μm or less in non-humidified conditions, and more preferably of 130 μm or less and the most preferably of 180 μm or less.

According to the present invention, the membrane/electrode assembly for direct methanol fuel cell is fixed to face the electrodes each other at both sides with the polymer electrolyte membrane therebetween and hot-pressed in conditions of a regular time, a regular temperature and a regular pressure to be manufactured. In the present invention, the temperature of a hot-pressing process is 150° C. or less, more preferably be 130° C. or less, and the most preferably be 110° C. or less. In the present invention, the pressure of the hot-pressing process is 2000 psi or less, more preferably be 1000 psi or less and the most preferably be 800 psi or less. In the present invention, the time of the hot-pressing process is ten minutes or less, more preferably be five minutes or less and the most preferably be three minutes or less.

A better understanding of the construction of a fuel cell introducing a new bipolar plate suggested in the present invention and the assembly thereof may be obtained in the preferred embodiments where the manufacturing steps are more concretely shown. It should be construed that the embodiments will be set forth to understand the contents of the present invention but not to limit the scope of a right of the present invention.

Embodiment 1

Manufacturing Cathode Catalyst Ink

The platinum catalyst (E-TEK) uses a platinum black catalyst as an example of an cathode and mixes it with Nafion solution of 5% (w/w) being an electrode binder so that the content of the electrode binder becomes 5% (w/w). After putting them into a mixed solution of water and alcohol, they are stirred and dispersed to manufacture a catalyst ink.

Embodiment 2

Manufacturing Anode Catalyst Ink

The platinum catalyst (E-TEK) uses a platinum/ruthenium (1/1) mixed catalyst as an example of a anode and mixes it with Nafion solution of 5% (w/w) being an electrode binder so that the content of the electrode binder becomes 15% (w/w). After putting them into a mixed solution of water and alcohol, they are stirred and dispersed to manufacture a catalyst ink.

Embodiment 3

Manufacturing Cathode

The catalyst ink manufactured in the embodiment 1 is coated with the amount of 0.1 to 5 $mg/cm^2$ on a carbon paper treated with PTFE. The carbon paper coated with catalyst ink is put in an oven and dried at 50 to 80° C. for one to ten minutes to manufacture an cathode.

Embodiment 4

Manufacturing Anode

The catalyst ink manufactured in the embodiment 2 is coated with the amount of 0.1 to 5 $mg/cm^2$ on a carbon paper treated with PTFE. The carbon paper coated with catalyst is put in an oven and dried at 50 to 80° C. for one to ten minutes to manufacture a anode.

Embodiment 5

Manufacturing Membrane/Electrode Assembly

Nafion polymer electrolyte membrane is placed between the anode and the cathode prepared in the embodiments 3 and 4 to manufacture a membrane/electrode assembly using a hot-press. At this time, the hot-press is maintained for one to ten minutes at the temperature of 100 to 150° C. and the pressure of 800 to 2,000 psi.

Embodiment 6

Assembling Unit Cell by Coupling the Membrane/Electrode Assembly with New Bipolar Plate The membrane/electrode assembly prepared in the embodiment 5 is coupled with the bipolar plate manufactured in FIG. 1 at both surfaces to configure a unit cell.

Comparison Example

Figure 2:
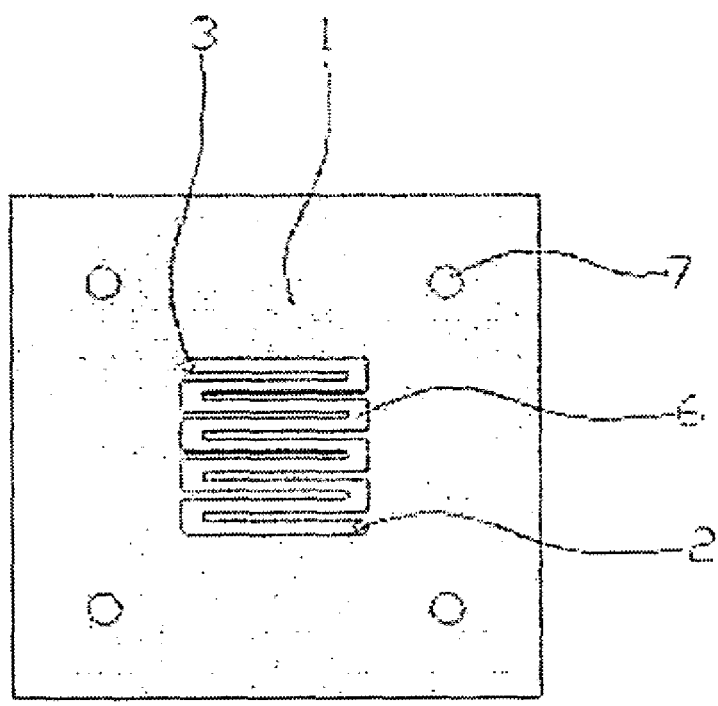
FIG. 2 is a schematic view of a bipolar plate manufactured in accordance with a comparison example.

Assembling Unit Cell by Coupling the Membrane/Electrode Assembly with the Existing Bipolar Plate The membrane/electrode assembly prepared in the embodiment 5 is coupled with the bipolar plate having the fluid path with the existing serpentine type prepared in FIG. 2 at both surfaces to configure a unit cell.

Examination Example

Examining the Performance of Membrane/Electrode Assembly

Figure 3:
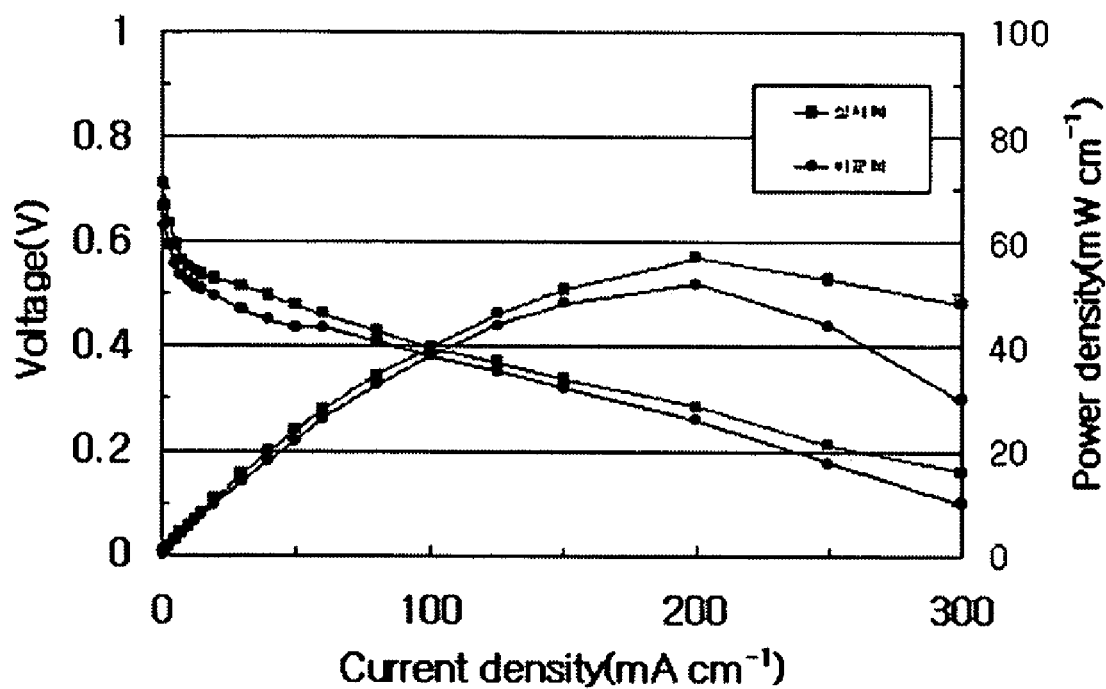
FIG. 3 shows the performance of a unit cell manufactured by the embodiment and the comparison example at 30° C. two days after a fuel was supplied.

In order to measure the performance of a unit cell introducing the new bipolar plate as shown in the embodiment 6 and introducing the existing bipolar plate as shown in Comparison Example 1, a fuel cell is discharged by an electric load after the fuel was supplied and the change of a voltage according to the current density is measured and the results are shown in FIG. 3. At this time, the condition for operating a cell is 30° C., the amount of supplying methanol (concentration of 0.1 to 10M) is 0.3 to 10 cc/min and the flow rate of supplying oxygen or air is 100 to 1000 cc/min.

As seen in FIG. 3, the fuel cell introducing the bipolar plate of the present invention has better characteristics in comparison with the fuel cell introducing the existing bipolar plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

According to the present invention, a newly developed bipolar plate for direct methanol fuel cells is introduced to increase a reaction region between fuels and a catalyst layer as well as easily supply fuels to fuel cells and decrease a fuel flow resistance and therefore the performance of a unit cell is enhanced.

What is claimed is:

1. A bipolar plate for direct methanol fuel cell, wherein the structure of an inlet and an outlet of said bipolar plate include a substantially triangular baffle to uniformly disperse the fluid, and the flow path extends from the substantially triangular baffle of the inlet and the outlet, and includes a dispersion structure, and
   wherein the flow path through the dispersion structure includes a tap selected from a dot type, a rhombus type, a rectangular type, a cone type or a converse triangle type.

2. The bipolar plate for direct methanol fuel cell of claim 1, wherein the tap of the bipolar plate has the diameter of 0.5 to 5 mm and the height of 0.01 to 10 mm.

3. The bipolar plate for direct methanol fuel cell of claim 1, wherein the interval between the taps of the bipolar plate is 0.5 to 10 mm.

4. The bipolar plate for direct methanol fuel cell of claim 1, wherein the bipolar plate is made of a material with good electric conductance and corrosion-resistance in order to include roles as a collection plate.

5. The bipolar plate for direct methanol fuel cell of claim 4, wherein the material of the bipolar plate is one selected from graphite block, titanium, stainless steel, brass or silver.

* * * * *